April 7, 1925.
A. D. HADSEL
1,532,743
FLEXIBLE COUPLING
Filed June 4, 1923     2 Sheets-Sheet 1
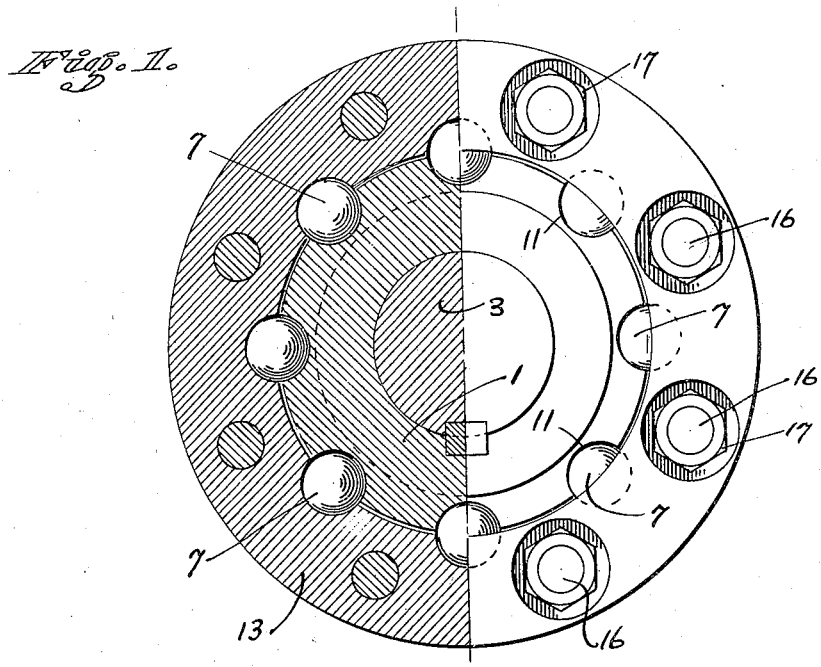
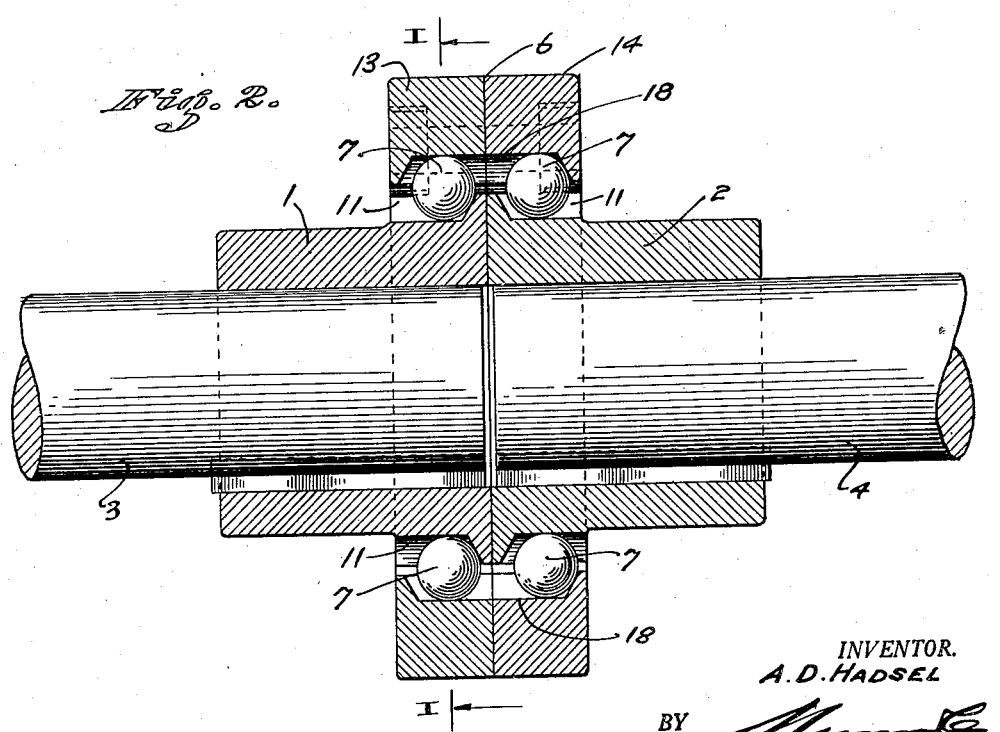
INVENTOR.
A. D. HADSEL
BY 
ATTORNEYS.

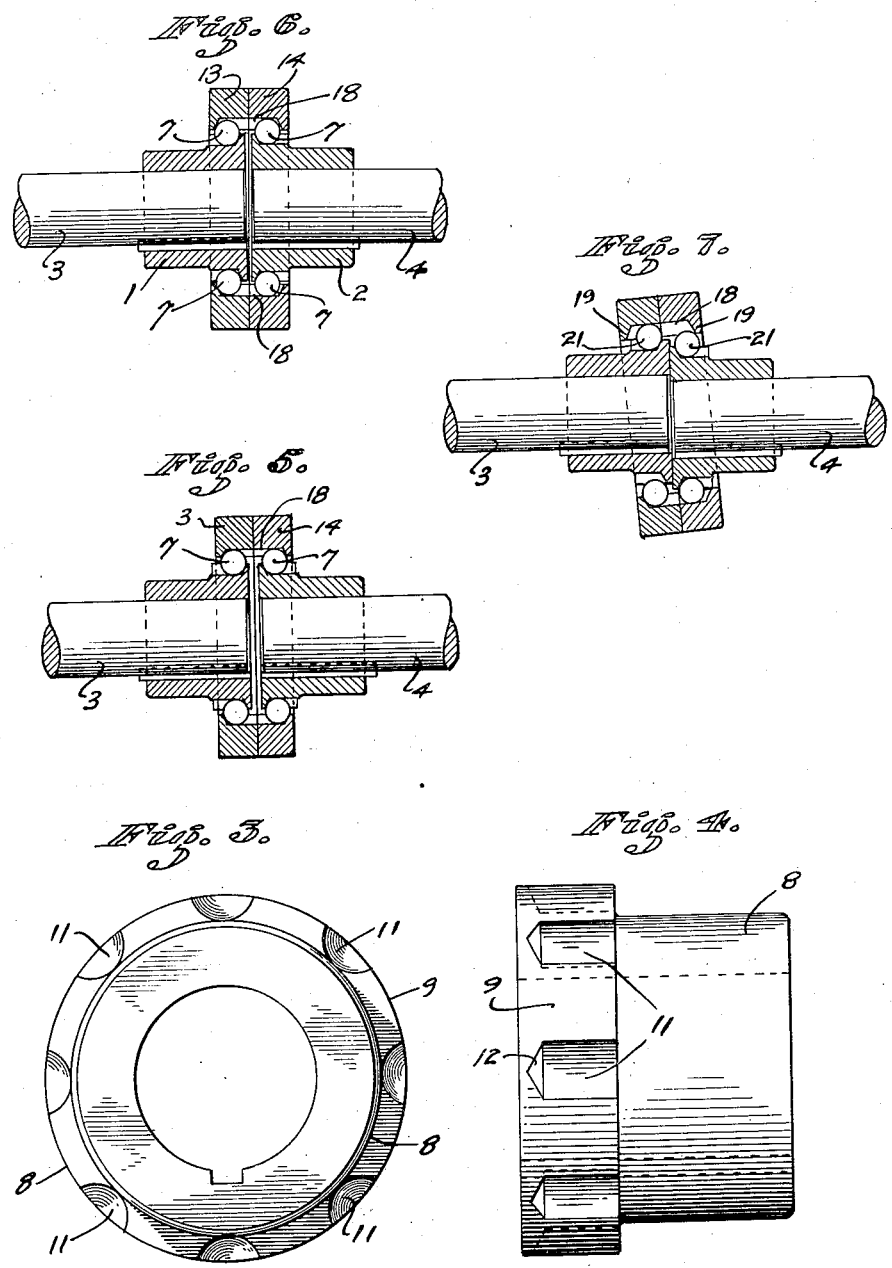

Patented Apr. 7, 1925.

1,532,743

UNITED STATES PATENT OFFICE.

ALVAH D. HADSEL, OF SAN FRANCISCO, CALIFORNIA, ASSIGNOR OF ONE-HALF TO FREDERICK N. WOODS, JR., OF SAN FRANCISCO, CALIFORNIA.

FLEXIBLE COUPLING.

Application filed June 4, 1923. Serial No. 643,457.

*To all whom it may concern:*

Be it known that I, ALVAH D. HADSEL, a citizen of the United States, and a resident of San Francisco, county of San Francisco, and State of California, have invented a new and useful Flexible Coupling, of which the following is a specification.

The present invention relates to improvements in flexible couplings for shafts. Its particular object is to provide a coupling that is comparatively simple in construction, that allows of longitudinal motion of one of the shafts relative to the other, that allows of a tilting motion of one shaft relative to the other so that the shafts may be axially disalined, and disposed at an angle to one another, and that further allows the shafts to be axially disalined while remaining parallel to one another. Further objects and advantages of the device will appear as the specification proceeds.

The preferred form of the invention is illustrated in the accompanying drawing in which Figure 1 shows an end view of my coupling, partly taken in section along line I—I of Figure 2; Figure 2 a longitudinal section through the same; Figure 3 an end view of one of the elements to be coupled; Figure 4 a side view of the same; Figure 5 a longitudinal section through the coupling showing the shafts spaced apart; Figure 6 a similar section showing the shafts disposed at an angle to one another; and Figure 7 a similar section showing the shafts axially disalined although parallel.

While I have shown only the preferred form of the invention it should be understood that various changes and modifications may be made within the scope of the claims hereto attached without departing from the spirit of the invention.

The principal parts of my coupling are the two sleeve elements (1) and (2) adapted to be keyed to the two shafts (3) and (4), a ring (6) and balls (7) interposed between the sleeve elements and the ring. One of the sleeve elements is illustrated in detail in Figures 3 and 4 and comprises a sleeve (8) having a collar (9) at one end, which latter is provided with a plurality of longitudinal grooves (11) stopping short of the end of the collar as shown at (12). The two sleeve elements are made symmetrical in form.

The ring (6) preferably consists of two ring elements (13) and (14) secured to one another so as to form a single ring unit by means of bolts (16) and nuts (17). The ring is provided with a plurality of internal longitudinal grooves (18) corresponding in number to the grooves (11) of the collars (9). The grooves (18) extend through the central portion of the ring (6) and stop short of both ends as shown at (19). The ring is sufficiently large to leave an annular space when placed around the adjacent ends of the two sleeve elements (1) and (2).

When the ring is in place each internal groove of the same registers with two external grooves in the collars (9) of the two sleeve elements and balls (21) are disposed to ride in these registering grooves. The dimensions of the respective grooves are such that while the balls transmit rotary motion from one shaft to the other they allow of longitudinal motion of one shaft relative to the other as shown in Figure 5. The arrangement further allows the two shafts to assume the position shown in Figure 6 in which the axes of the shafts are disposed at an angle to one another. A further position taken care of by this arrangement of flexible coupling is that shown in Figure 6 in which the shafts are parallel but out of alinement.

I claim:

1. A flexible coupling comprising two cylindrical elements having external longitudinal grooves therein stopping short of the ends of the elements, a ring adapted to encircle adjacent ends of the elements so as to leave an annular space around the same having registering internal grooves therein stopping short of its respective ends and balls engaging registering internal and external grooves the ring being dimensioned to allow of limited longitudinal and tilting motion of the elements relative to the ring.

2. A flexible coupling comprising two cylindrical elements placed in end to end position, a ring encircling the abutting ends of the elements and being dimensioned to leave enough clearance relative to its length to allow of tilting motion of the two elements within the same, the ring being formed with internal grooves stopping short of the ends thereof and the elements with registering external grooves stopping short of the ends thereof and balls riding in the grooves to make a driving connection between the element and to limit endwise motion of the elements while not interfering with the tilting motion.

ALVAH D. HADSEL.